(12) United States Patent
Leonard et al.

(10) Patent No.: US 10,421,328 B2
(45) Date of Patent: Sep. 24, 2019

(54) END MEMBER ASSEMBLIES AS WELL AS GAS SPRING ASSEMBLIES, SUSPENSION SYSTEMS AND METHODS

(71) Applicant: Firestone Industrial Products Company, LLC, Nashville, TN (US)

(72) Inventors: Joshua R. Leonard, Noblesville, IN (US); Graham R. Brookes, Noblesville, IN (US); Paul J. Fessel, Franklin, TN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 15/566,885

(22) PCT Filed: Apr. 14, 2016

(86) PCT No.: PCT/US2016/027592
§ 371 (c)(1),
(2) Date: Oct. 16, 2017

(87) PCT Pub. No.: WO2016/168500
PCT Pub. Date: Oct. 20, 2016

(65) Prior Publication Data
US 2018/0093542 A1 Apr. 5, 2018

Related U.S. Application Data

(60) Provisional application No. 62/149,505, filed on Apr. 17, 2015.

(51) Int. Cl.
*B60G 11/27* (2006.01)
*F16F 9/04* (2006.01)

(52) U.S. Cl.
CPC .............. *B60G 11/27* (2013.01); *F16F 9/049* (2013.01); *F16F 9/0472* (2013.01); *B60G 2202/152* (2013.01); *B60G 2206/424* (2013.01)

(58) Field of Classification Search
CPC ......... B60G 5/12; B60G 17/00; B60G 17/005
(Continued)

(56) References Cited

U.S. PATENT DOCUMENTS 2,842,359 A  7/1958 Christian
9,770,958 B2 * 9/2017 Leonard ................ F16F 9/0472
(Continued)

FOREIGN PATENT DOCUMENTS

DE   102013107826   1/2015
EP        0166702    1/1986
(Continued)

OTHER PUBLICATIONS

International Search Report for corresponding patent application No. PCT/US2016/27592 dated Jun. 16, 2016.

*Primary Examiner* — Christopher P Schwartz
(74) *Attorney, Agent, or Firm* — Brian D. McAlhaney; Fay Sharpe LLP

(57) ABSTRACT

End member assemblies include an end member wall dimensioned for securement to a flexible spring member to at least partially define a spring chamber. A reservoir wall is supported on the end member wall and at least partially defines a reservoir chamber having a substantially-fixed volume. The reservoir wall includes at least one passage such that the reservoir chamber is disposed in fluid communication with the spring chamber. A passive control device is operatively associated with the passage such that under a first predetermined condition the passive control device is in a first operable condition in which the gas spring assembly has a first spring rate and such that under a second predetermined condition of use the passive control device is in a second operable condition in which the gas spring assembly has a second spring rate. Gas spring assemblies and suspension systems are also included.

20 Claims, 7 Drawing Sheets

(58) Field of Classification Search
USPC .................................. 267/64.24, 64.27, 120
See application file for complete search history.

(56) References Cited

U.S. PATENT DOCUMENTS

| | | | | |
|---|---|---|---|---|
| 2008/0284072 | A1* | 11/2008 | Hayes | B60G 11/27 267/119 |
| 2012/0061887 | A1 | 3/2012 | Westnedge | |
| 2013/0056917 | A1* | 3/2013 | Buttner | F16F 9/052 267/64.27 |
| 2013/0207329 | A1* | 8/2013 | Leonard | B60G 11/62 267/220 |
| 2014/0070468 | A1* | 3/2014 | Leonard | B60G 11/27 267/64.27 |
| 2015/0008627 | A1* | 1/2015 | Leonard | F16F 7/09 267/64.24 |

FOREIGN PATENT DOCUMENTS

| | | |
|---|---|---|
| FR | 1337108 | 9/1963 |
| WO | WO 2013/181241 | 12/2013 |

\* cited by examiner

END MEMBER ASSEMBLIES AS WELL AS GAS SPRING ASSEMBLIES, SUSPENSION SYSTEMS AND METHODS

BACKGROUND

The subject matter of the present disclosure broadly relates to the art of gas spring devices and, more particularly, to end member assemblies that are constructed to passively alter the spring rate of an associated gas spring assembly from a first spring rate utilized under a first condition of use to a second spring rate upon experiencing an associated event triggering a second condition of use. Gas spring assemblies including such end member assemblies and suspension systems including one or more of such gas spring assemblies as well as methods of manufacture are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Generally, the plurality of spring devices function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring devices that have as low of a spring rate as is practical, as the use of lower spring rate elements can provide improved ride quality and comfort compared to spring devices having higher spring rates. That is, it is well understood in the art that the use of spring devices having higher spring rates (i.e., stiffer springs) will transmit a greater magnitude of road inputs into the sprung mass of the vehicle and that this typically results in a rougher, less-comfortable ride. Whereas, the use of spring devices having lower spring rates (i.e., softer, more-compliant springs) will transmit a lesser amount of road inputs into the sprung mass and will, thus, provide a more comfortable ride.

In some cases, however, it may be desirable to temporarily increase the spring rate of the spring devices. For example, coil springs that have a progressively increasing spring rate are well known and commonly used to provide added stiffness to a suspension system upon experiencing a sudden impact or other transient input.

In some cases, the spring devices can take the form of gas spring assemblies that utilize pressurized gas as the working medium. Gas spring assemblies of various types, kinds and constructions are well known and commonly used. Typical gas spring assemblies can include a flexible wall that is secured between comparatively rigid end members and/or end member assemblies.

Generally, it is possible to reduce the spring rate of gas spring assemblies, thereby improving ride comfort, by increasing the volume of pressurized gas operatively associated with the gas spring assembly. This is commonly done by placing an additional chamber, cavity or volume filled with pressurized gas into fluid communication with the primary spring chamber of the gas spring assembly. Such additional volumes are commonly retained in constant fluid communication with the primary spring chamber of the gas spring assembly such that a reduced spring rate of the gas spring assembly is maintained.

In other cases, however, it may be desirable to vary the active volume of the gas spring assembly to vary the spring rate thereof and provide different performance characteristics for the gas spring assembly as conditions of use change. In known constructions, such variations in spring rate are commonly initiated or otherwise performed by electronic systems that actuate control valves and other devices in response to sensor signals and other inputs.

Notwithstanding the broad usage and overall success of the wide variety of gas spring assemblies that are known in the art, it is believed that a need exists to confront one or more of these competing goals, to overcome other disadvantages of known constructions and/or otherwise advance the art of gas spring devices while still retaining comparable or improving factors such as performance, ease of manufacture, ease of assembly, ease of installation and/or reduced cost of manufacture.

BRIEF DESCRIPTION

One example of an end member assembly in accordance with the subject matter of the present disclosure is dimensioned for securement to an associated flexible spring member to at least partially form an associated gas spring assembly with an associated spring chamber. The end member assembly can include an end member wall dimensioned for securement to the associated flexible spring member to at least partially define the associated spring chamber. A reservoir wall can be supported on the end member wall and can at least partially define a reservoir chamber having a substantially-fixed volume. The reservoir wall can include at least one passage formed therethrough such that the reservoir chamber can be disposed in fluid communication through the at least one passage with the associated spring chamber. A passive control device can be operatively associated with the passage such that under a first predetermined condition of use the passive control device is in a first operable condition in which the associated gas spring assembly would have a first spring rate. The passive control device can also be operatively associated with the passage such that under a second predetermined condition of use the passive control device is in a second operable condition in which the associated gas spring assembly would have a second spring rate that is different from the first spring rate.

One example of a gas spring assembly in accordance with the subject matter of the present disclosure can include a flexible spring member having a longitudinal axis and extending lengthwise between a first end and a second end that is opposite the first end to at least partially define a spring chamber. A first end member can be secured across the first end of the flexible spring member such that a substantially fluid-tight seal is formed therebetween. An end member assembly according to the foregoing paragraph can be secured across the second end of the flexible spring member such that a substantially fluid-tight seal is formed therebetween.

One example of a suspension system in accordance with the subject matter of the present disclosure can include a pressurized gas system including a pressurized gas source and a control device in fluid communication with the pressurized gas source. At least one gas spring assembly in accordance with the foregoing paragraph can be disposed in fluid communication with the pressurized gas source with the control device disposed in fluid communication therebetween.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
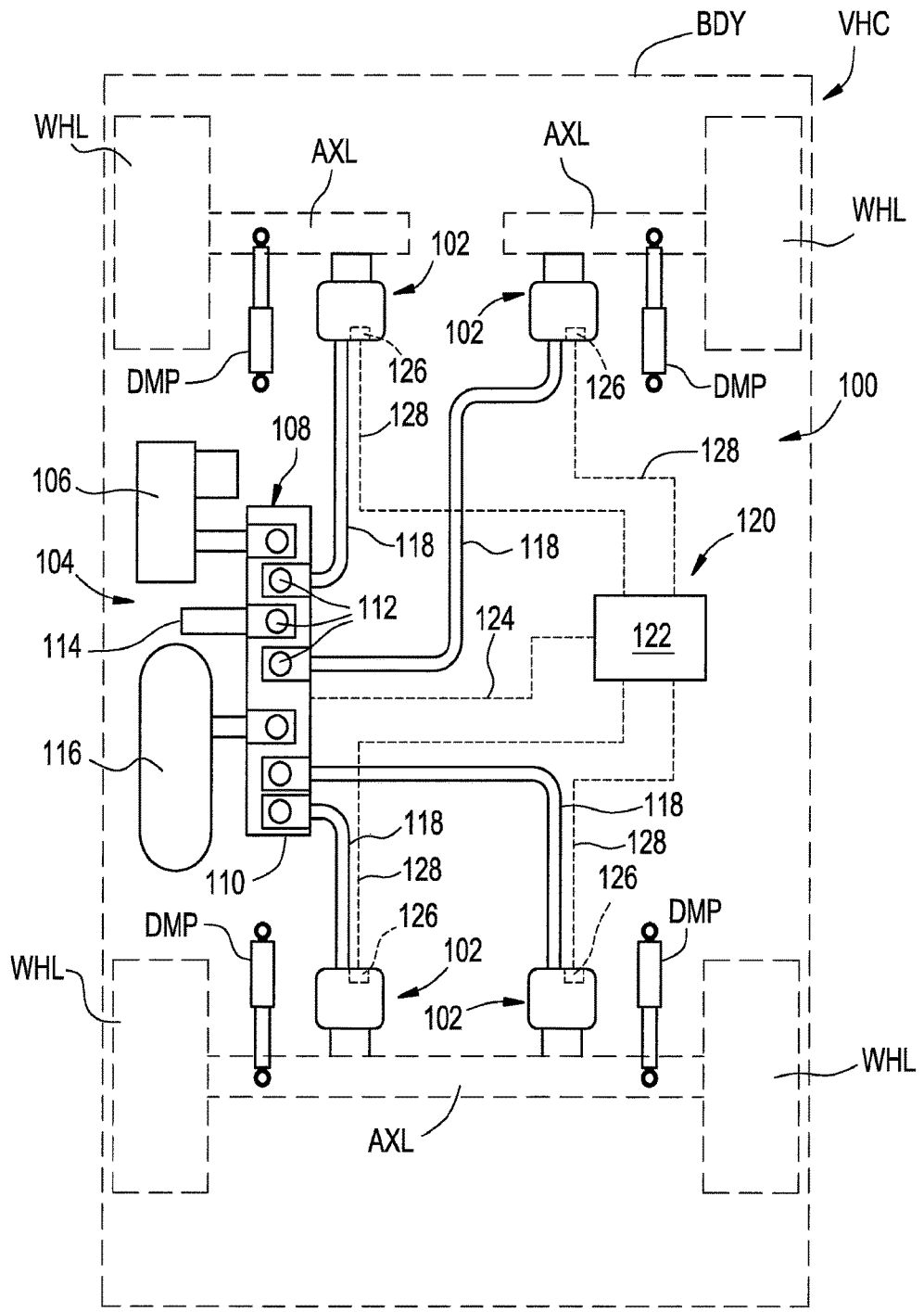
FIG. 1 is a schematic representation of one example of a suspension system of an associated vehicle that includes one or more gas spring assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will be appreciated that such a suspension system of the vehicle can, optionally, include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas, such as storing pressurized gas at a pressure level greater than atmospheric pressure for an extended period of time (e.g., minutes, hours, days, weeks or months).

Valve assembly 108 can be in fluid communication with gas spring assemblies 102 in any suitable manner, such as through suitable gas transfer lines 118, for example. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices 126, such as, for example, may be operatively associated with the gas spring assemblies and capable of outputting or otherwise generating data, signals and/or other communications having a relation to a height of the gas spring assemblies or a distance between other components of the vehicle. Height sensing devices 126 can be in communication with ECU 122, which can receive the height or distance signals therefrom. The height sensing devices can be in communication with ECU 122 in any suitable manner, such as through conductors or leads 128, for example. Additionally, it will be appreciated that the height sensing devices can be of any suitable type, kind and/or construction.

Figure 2:
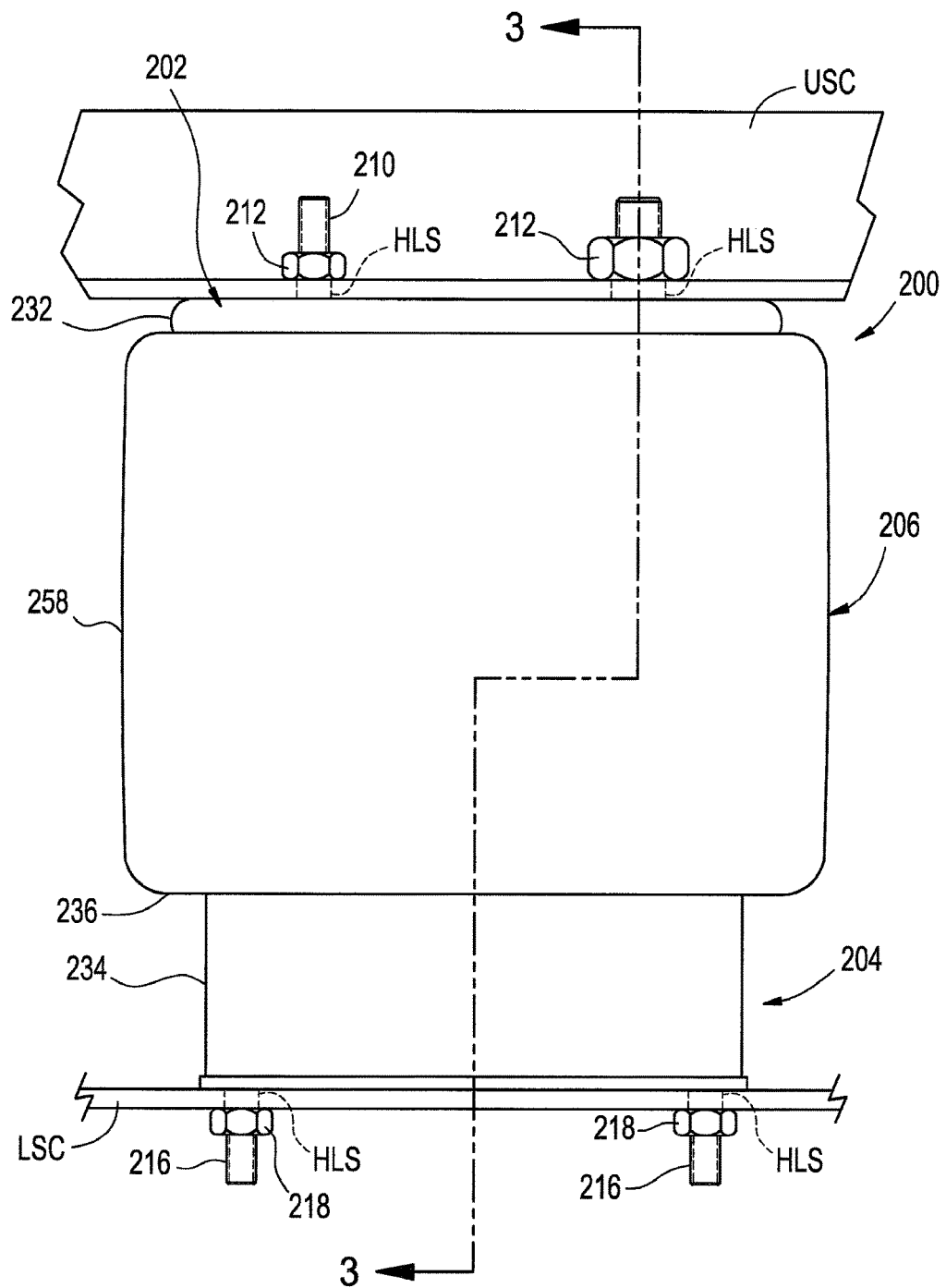
FIG. 2 is a side view of one example of a gas spring assembly in accordance with the subject matter of the present disclosure.
Figure 3:
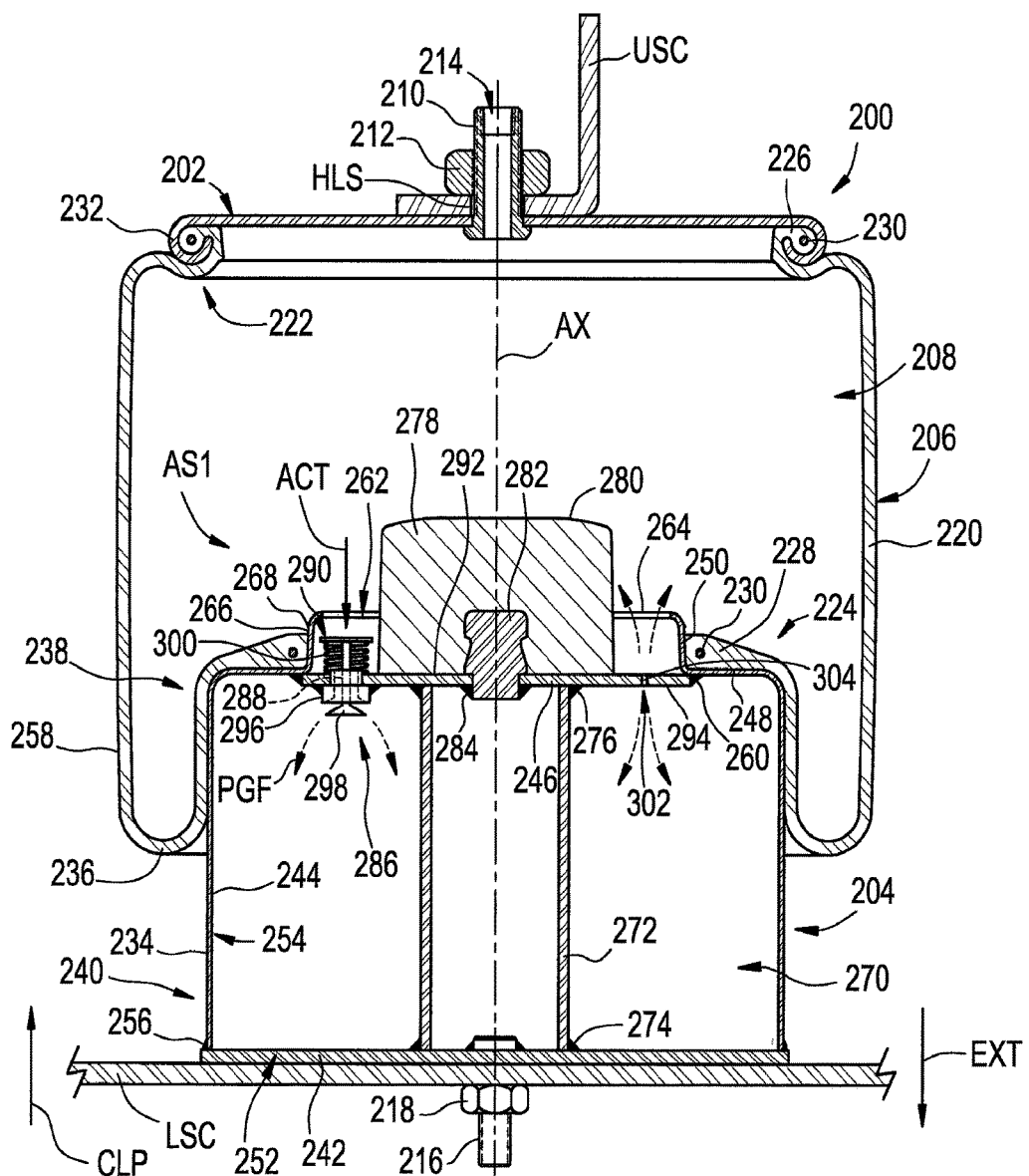
FIG. 3 is a cross-sectional side view of the gas spring assembly in FIG. 2 taken from along line 3-3 therein.

One example of a gas spring assembly 200 in accordance with the subject matter of the present disclosure, such as may be suitable for use as one of gas spring assemblies 102 in FIG. 1, for example, is shown in FIGS. 2 and 3 as having a longitudinally-extending axis AX (FIG. 3) and can include one or more end members, such as, for example, an end member 202 and an end member 204 that is spaced longitudinally from end member 202. A flexible spring member 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 212 or other securement devices, for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 214 (FIG. 3), for example, can optionally be provided to permit fluid communication with spring chamber 208, such as may be used for transferring pressurized gas into and/or out of the spring chamber, for example. In the exemplary embodiment shown, transfer passage 214 extends through at least one of mounting studs 210 and is in fluid communication with spring chamber 208. It will be appreciated, however, that any other suitable fluid communication arrangement could alternately be used.

End member 204 can be secured along a second or lower structural component LSC, such as an axle AXL in FIG. 1, for example, in any suitable manner. As one example, lower structural component LSC could include one or more mounting holes HLS extending therethrough. In such case, a mounting stud 216 could be operatively connected to end member 204 and/or another component of the gas spring assembly, and could extend through one of mounting holes HLS, such as to receive a corresponding threaded nut 218, for example.

Flexible spring member 206 can be of any suitable size, shape, construction and/or configuration. As one example, flexible spring member 206 can include a flexible wall 220 that is at least partially formed from one or more layers or plies of elastomeric material (e.g., natural rubber, synthetic rubber and/or thermoplastic elastomer) and can optionally include one or more plies or layers of filament reinforcing material. Flexible wall 220 is shown extending in a longitudinal direction between opposing ends 222 and 224. In some cases, flexible spring member 206 can, optionally, include a mounting bead disposed along either one or both of ends 222 and 224 of the flexible wall. In the arrangement shown in FIGS. 2 and 3, mounting beads 226 and 228 are shown as being respectively disposed along ends 222 and 224. In some cases, the mounting beads can, optionally, include a reinforcing element, such as an endless, annular bead wire 230, for example.

It will be appreciated that the one or more end members can be of any suitable type, kind, construction and/or configuration, and can be operatively connected or otherwise secured to the flexible wall in any suitable manner. In the exemplary arrangement shown in FIGS. 2 and 3, for example, end member 202 is of a type commonly referred to as a bead plate that is secured to first end 222 of flexible spring member 206, such as by crimping or otherwise deforming an outer peripheral portion 232 of end member 202 to form a substantially fluid-tight, crimped-edge connection with mounting bead 226 and/or end 222 of flexible spring member 206.

End member 204 is shown in the exemplary arrangement in FIGS. 2 and 3 as being of a type commonly referred to as a piston (or a roll-off piston) that has an outer surface 234 that abuttingly engages flexible spring member 206 such that a rolling lobe 236 is formed therealong. As gas spring assembly 200 is displaced between extended and collapsed conditions, as is respectively represented in FIG. 3 by arrows EXT and CLP, rolling lobe 236 can be displaced along outer surface 234 in a conventional manner.

As identified in FIG. 3, end member 204 extends generally between a first or upper end 238 and a second or lower end 240. End member 204 can be formed from any suitable material or combination of materials, and can include any suitable number of one or more components. As one example, the end member can be at least partially formed from metal and/or polymeric materials including one or more walls and/or wall portions. As another example, the end member could be formed from two or more parts and/or components that are secured together, such as by way of one or more securement devices and/or flowed-material joints, for example.

In the arrangement shown in FIGS. 2 and 3, end member 204 is shown as including a mounting wall portion 242, a side wall portion 244 and a partition wall portion 246. In some cases, end member 204 can also include an end wall portion 248 and a side wall portion 250. In the arrangement shown in FIGS. 2 and 3, for example, mounting wall portion 242 at least partially defines a wall section 252, and at least side wall portion 244 and partition wall portion 246 define a wall section 254 of end member 204. In some cases, wall section 252 can at least partially form a component that may be referred to as a piston base, and wall section 254 can at least partially form a component may be referred to as a piston shell. Additionally, it will be appreciated that wall sections 252 and 254 can be secured to one another in any manner suitable for forming a substantially fluid tight connection between two or more of the wall portions thereof, such as by way of a flowed-material joint 256, for example.

It will be appreciated, however, that other configurations and/or constructions could alternately be used.

Side wall portion 244 of end member 204 can include outer surface 234 that is dimensioned to abuttingly engage an outer surface 258 of flexible spring member 206 such that rolling lobe 236 is formed along flexible wall 220. As gas spring assembly 200 is displaced between compressed and extended conditions, rolling lobe 236 can be displaced along outer surface 234 in a generally conventional manner, as mentioned above. It will be recognized that a wide variety of sizes, shapes, profiles and/or configurations can and have been used in forming end members of the type and kind referred to as pistons or roll-off pistons, such as end member 204, for example. As such, it will be appreciated that the wall portions of the end member (e.g., side wall portion 244 and outer surface 234 thereof) can be of any suitable shape, profile and/or configuration, such as may be useful to provide one or more desired performance characteristics, for example, and that the profile shown in FIGS. 2 and 3 is merely exemplary.

As indicated above, it will be appreciated that the one or more end members of the gas spring assembly can be operatively connected or otherwise secured to the flexible spring member in any suitable manner. For example, wall section 254 of end member 204 can include side wall portion 250 that extends longitudinally-outward beyond partition wall portion 246 and/or end wall portion 248, and extends peripherally about axis AX. It will be appreciated that side wall portion 250 can be formed with and/or operatively connected to one or more other wall portions of wall section 254 in any suitable manner. As one example, side wall portion 250 can be integrally formed with side wall portion 244 and end wall portion 248. In such case, partition wall portion 246 can be secured on or along end wall portion 252 and/or side wall portion 250 such that a substantially fluid-tight seal is formed therebetween, such as by way of a flowed-material joint 260, for example.

In a preferred arrangement, side wall portion 250 can be positioned such that end wall portion 248 extends radially-outward from side wall portion 250 toward side wall portion 244. In such case, side wall portion 250 can at least partially define an opening 262 into end member 204. Partition wall portion 246 can be positioned to extend radially-inward from along end wall portion 248 and/or side wall portion 250. In such case, partition wall portion 246 can extend at least partially across opening 262. Additionally, side wall portion 250 extend axially away from end wall portion 248 toward a distal edge 264. Side wall portion 250 can also include an outer surface 266 that is dimensioned to receive mounting bead 228 of end 224 of flexible wall 206 such that a substantially fluid-tight seal can be formed therebetween. In some cases, a retaining ridge 268 can project radially-outwardly from along the side wall portion 250 and can extend peripherally along at least a portion thereof, such as may assist in retaining end 224 of flexible wall 206 in abutting engagement on or along the side wall portion.

A gas spring assembly in accordance with the subject matter of the present disclosure can include an additional volume, reservoir and/or other chamber that is capable of being passively introduced to and/or isolated from the spring chamber (e.g., spring chamber 208) of the gas spring assembly. In the arrangement shown in FIGS. 2 and 3, for example, end member 204 includes an end member reservoir 270 that is at least partially formed by one or more wall portions of the end member, such as one or more of mounting wall portion 242, side wall portion 244 and/or partition wall portion 246, for example.

In some cases, end member 204 can include one or more additional features and/or components that can be included within end member reservoir 270. For example, end member 204 is shown in FIG. 3 as including a post or column 272 that extends between an end (not numbered) operatively connected to mounting wall portion 242 and an end (not numbered) disposed along and/or, optionally, operatively connected to partition wall portion 246. It will be appreciated that such a post, which is optional, can be secured on or along mounting wall portion 242 and/or partition wall portion 246 in any suitable manner. For example, one end of post 272 can be secured to mounting wall portion 242 in a manner suitable for forming a substantially fluid-tight connection with the mounting wall portion, such as by way of a flowed-material joint 274, for example. Additionally, or in the alternative, the other end of post 272 can be secured to partition wall portion 246 in a manner suitable for forming a substantially fluid-tight connection with the mounting wall portion, such as by way of an optional flowed-material joint 276, for example.

Furthermore, it will be appreciated that a gas spring assembly in accordance with the subject matter of the present disclosure (e.g., assemblies 102 and/or 200) can include any number of one or more additional features, components and/or devices. For example, gas spring assembly 200 can, optionally, include a jounce bumper supported on one of the end members and suitable for inhibiting direct contact between the end members and/or transferring axially-applied loads or forces between the end members. It will be appreciated that the jounce bumper, if included, can be of any suitable size, shape and/or construction, and can be secured on or along the associated end member in any suitable manner. In the arrangement shown in FIG. 3, for example, gas spring assembly 200 includes a jounce bumper 278 that is supported along end member 204 and includes a distal end wall 280 dimensioned to abuttingly engage end member 202 or another component, such as may occur during a jounce or collapsed condition of the gas spring assembly.

In some cases, a bumper mount 282 can be disposed on or along end member 204 and can be dimensioned to receive and retain jounce bumper 278. It will be appreciated that bumper mount 282 can be secured to the end member in any suitable manner. As one example, partition wall portion 246 can include a hole or opening (not numbered) extending therethrough and a portion of bumper mount 282 can extend through the hole or opening. Bumper mount 282 can be secured on or along partition wall portion 246 in any suitable manner, such as by way of a flowed-material joint 284, for example. In this manner, axially applied loads or forces can be transmitted from jounce bumper 278, through post 272 to mounting wall portion 242, such as from impacts imparted on the jounce bumper, for example.

A gas spring assembly according to the subject matter of the present disclosure is constructed to operate at a first spring rate under a first predetermined condition, such as, for example, during conditions in which normal body bounce and roll inputs are experienced under dynamic use of an associated vehicle (e.g., vehicle VHC in FIG. 1). A gas spring assembly according to the subject matter of the present disclosure is also constructed to operate at a second spring rate under a second predetermined condition, such as, for example, during conditions when sudden or harsh impacts or other transient inputs of a large magnitude (e.g., sudden engagement of a pothole in a road surface) are experienced during dynamic use of the associated vehicle. In some cases, the second predetermined condition could be characterized as a predetermined pressure differential between gas within a spring chamber (e.g., spring chamber 208) and the gas within an additional volume, reservoir or other chamber (e.g., end member reservoir 270). In other cases, the second predetermined condition could be characterized as a predetermined acceleration being applied to an end member (e.g., end member 204) and associated components thereof. Upon exceeding the predetermined pressure differential, predetermined acceleration or other predetermined threshold, one or more control devices can be passively actuated to vary the gas spring assembly from operating at the first spring rate to operating at the second spring rate. Upon decreasing from the predetermined pressure differential, predetermined acceleration or other predetermined threshold, the one or more control devices can be passively actuated to return the gas spring assembly to the first spring rate from the second spring rate. In some cases, the first spring rate can be less than the second spring rate. In other cases, the first spring rate can be greater than the second spring rate.

As mentioned above, a gas spring assembly according to the subject matter of the present disclosure can include at least one flow control system that is operatively connected between the spring chamber and the volume, reservoir or other chamber of the gas spring assembly. In a preferred arrangement, the one or more flow control systems can be adapted for passive operation (i.e., actuation or activation without manual input from a user or electronic input from an associated system or device) to selectively permit and/or inhibit pressurized gas flow between the spring chamber and the corresponding pressurized gas volume, reservoir or other chamber in one or more directions of flow.

It will be appreciated that the flow control systems can be of any suitable size, shape, configuration and/or construction, and can include any combination of features and components suitable for selectively permitting and/or inhibiting pressurized gas flow between the spring chamber and the corresponding pressurized gas volume, reservoir or other chamber. In some cases, flow control systems can include two or more gas flow passages and a control device operatively associated with one of the gas flow passages. In other cases, two or more control devices can be included with each control device operatively associated with a different one of the gas flow ports. Examples of passive operation of a control device can include differential-pressure actuation and/or inertial actuation. That is, in some cases, the one or more control devices can be differential pressure-actuated control devices that open and close in response to predetermined differential pressure conditions between the spring chamber and the corresponding pressurized gas volume. Additionally, or in the alternative, the one or more control devices can, in some cases, be inertially-actuated that open and close in response to the incurrence and abatement of acceleration inputs acting on one or more components of an end member of the gas spring assembly. In some cases, passive control devices that actuate as a result of inertial or acceleration-based inputs may be preferred.

One example of a suitable construction of flow control systems of a gas spring assembly in accordance with the subject matter of the present disclosure is shown in FIG. 3 as flow control system 286. Flow control system 286 is shown as being disposed on or along partition wall portion 246 of end member 204. As such, flow control assembly 286 is operatively associated with corresponding spring chamber 208 and end member reservoir 270 such that pressurized gas transfer into, out of and/or otherwise between spring chamber 208 and end member reservoir 270 can selectively occur.

In an assembled condition, the end member (e.g., end member 204) and the flow control system (e.g., flow control system 286) can be referred to herein as an end member assembly, such as is represented as end member assembly AS1 in FIG. 3, for example.

In the arrangement shown in FIG. 3, flow control assembly 286 is shown as including a gas flow port or passage 288 that extends through partition wall portion 246. As such, flow control assembly 286 can passively operate to selectively permit, inhibit and/or otherwise at least partially control pressurized gas can flow between spring chamber 208 and end member reservoir 270 through port 288. Flow control assembly 286 can also include at least one control device (e.g., a valve) that is fluidically associated with a corresponding one of the gas flow ports. In the arrangement shown in FIG. 3, a control device 290 is operatively associated with port 288.

In some cases, one or more of the control devices (e.g., control device 286) can take the form of one-way valves that substantially inhibit pressurized gas flow through a corresponding port in one direction while permitting pressurized gas flow through the corresponding port in the opposing direction, as is represented in FIG. 3 by arrows PGF. For example, control device 290 is shown as taking the form of a normally-closed valve that is naturally biased toward a closed condition and that is actuated or otherwise opened as a result of a predetermined gas pressure differential and/or a predetermined acceleration acting the control device, such as is represented in FIG. 3 by arrow ACT, for example. As such, control device 290 is shown as being disposed along opposing surfaces 292 and 294 of partition wall portion 246. In some cases, a valve seat 296 can be disposed on partition wall portion 246, such as along one of the surfaces thereof. It will be appreciated, however, that other configurations and/or arrangements could alternately be used.

Additionally, it will be appreciated that any combination of one or more types, kinds and/or constructions of control devices can be used. In the arrangement shown in FIG. 3, for example, control device 290 is shown as taking the form of spring-biased piston valves that includes a valve body 298 that is received within one of the ports and includes a head (not numbered) that abuttingly engages the partition wall portion and/or valve seat, a connecting rod (not numbered) that extends axially from the head and a flange (not numbered) that is secured along the connecting rod opposite the head. Additionally, the control devices include a biasing element 300, such as a compression spring, for example, that is operatively disposed between the flange and a surface of the partition wall portion.

The valve body of one or more of the control devices (e.g., control device 290) can be maintained in a normally-closed condition in any suitable manner that is capable of being selectively displaced into an open condition under the influence of a predetermined (or greater) gas pressure differential and/or a predetermined or greater acceleration input, as discussed above. In some cases, the valve body can be urged or otherwise biased into a closed condition by an external biasing element, such as biasing element 300, for example. In such cases, the biasing element can have intrinsic mechanical and/or material properties (e.g., spring rate and/or flexural stiffness) that maintain the associated control device in a closed condition until a predetermined differential gas pressure and/or predetermined acceleration input is reached or exceeded. Upon experiencing differential pressure conditions and/or acceleration inputs of at least approximately the predetermined magnitude, biasing element 300 can be compressed and valve body 298 can be displaced into an open condition, such as is shown in FIG. 3, for example.

Furthermore, gas spring assembly 200 can, optionally, be constructed to permit pressurized gas transfer to, from and between spring chamber 208 and end member reservoir 270 at the first spring rate under the first predetermined condition, such as, for example, during conditions in which normal body bounce and roll inputs are experienced under dynamic use of an associated vehicle (e.g., vehicle VHC in FIG. 1). For example, a control device 302 in the form of a passage or port 304 can extend through partition wall portion 246, as shown in FIG. 3. In a preferred arrangement, port 304 is an open passage that can be of any suitable size, shape and/or configuration to permit pressurized gas transfer into, out of and/or otherwise between spring chamber 208 and end member reservoir 270 under the first and/or second predetermined conditions.

Figure 4:
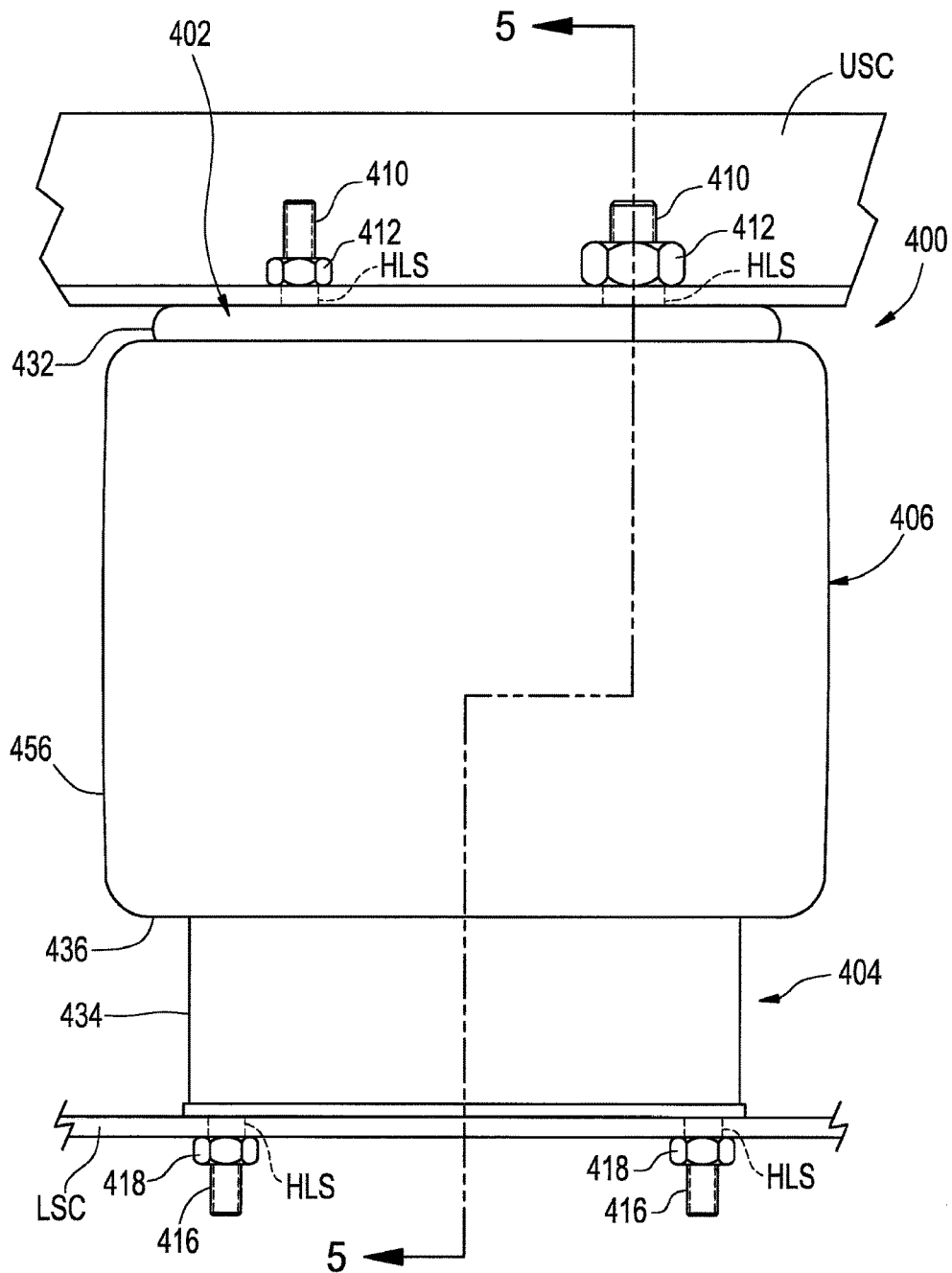
FIG. 4 is a side view of another example of a gas spring assembly in accordance with the subject matter of the present disclosure.
Figure 5:
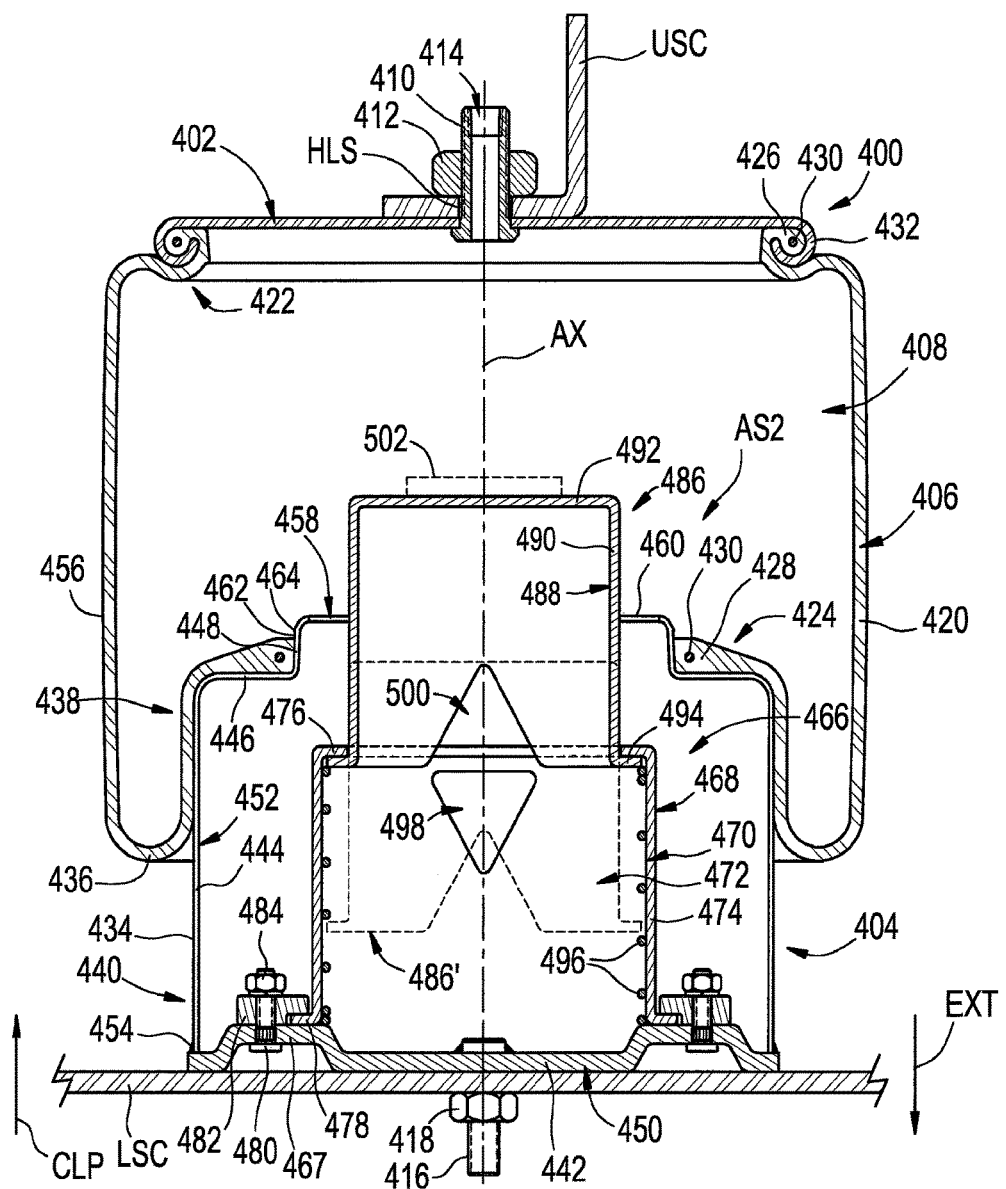
FIG. 5 is a cross-sectional side view of the gas spring assembly in FIG. 4 taken from along line 5-5 therein.

Another example of a gas spring assembly 400 in accordance with the subject matter of the present disclosure, such as may be suitable for use as one of gas spring assemblies 102 in FIG. 1, for example, is shown in FIGS. 4 and 5 as having a longitudinally-extending axis AX (FIG. 5) and can include one or more end members, such as, for example, an end member 402 and an end member 404 that is spaced longitudinally from end member 402. A flexible spring member 406 can extend peripherally around axis AX and can be secured between the end members in a substantially fluid-tight manner such that a spring chamber 408 (FIG. 5) is at least partially defined therebetween.

Gas spring assembly 400 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 4 and 5, for example, end member 402 is secured along a first or upper structural component USC, such as associated vehicle body BDY in FIG. 1, for example, and can be secured thereon in any suitable manner. For example, one or more securement devices, such as mounting studs 410, for example, can be included along end member 402. In some cases, the one or more securement devices (e.g., mounting studs 410) can project outwardly from end member 402 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 412 or other securement devices, for example. As an alternative to one or more of mounting studs 410, one or more threaded passages (e.g., blind passages and/or through passages) could be used in conjunction with a corresponding number of one or more threaded fasteners.

Additionally, a fluid communication port, such as a transfer passage 414 (FIG. 5), for example, can optionally be provided to permit fluid communication with spring chamber 408, such as may be used for transferring pressurized gas into and/or out of the spring chamber, for example. In the exemplary embodiment shown, transfer passage 414 extends through at least one of mounting studs 410 and is in fluid communication with spring chamber 408. It will be appreciated, however, that any other suitable fluid communication arrangement could alternately be used.

End member 404 can be secured along a second or lower structural component LSC, such as an axle AXL in FIG. 1, for example, in any suitable manner. As one example, lower structural component LSC could include one or more mounting holes HLS extending therethrough. In such case, a mounting stud 416 could be operatively connected to end member 404 and/or another component of the gas spring assembly, and could extend through one of mounting holes HLS, such as to receive a corresponding threaded nut 418, for example.

Flexible spring member 406 can be of any suitable size, shape, construction and/or configuration. As one example, flexible spring member 406 can include a flexible wall 420 that is at least partially formed from one or more layers or plies of elastomeric material (e.g., natural rubber, synthetic rubber and/or thermoplastic elastomer) and can optionally include one or more plies or layers of filament reinforcing material. Flexible wall 420 is shown extending in a longitudinal direction between opposing ends 422 and 424. In some cases, flexible spring member 406 can, optionally, include a mounting bead disposed along either one or both of ends 422 and 424 of the flexible wall. In the arrangement shown in FIGS. 4 and 5, mounting beads 426 and 428 are shown as being respectively disposed along ends 422 and 424. In some cases, the mounting beads can, optionally, include a reinforcing element, such as an endless, annular bead wire 430, for example.

It will be appreciated that the one or more end members can be of any suitable type, kind, construction and/or configuration, and can be operatively connected or otherwise secured to the flexible wall in any suitable manner. In the exemplary arrangement shown in FIGS. 4 and 5, for example, end member 402 is of a type commonly referred to as a bead plate that is secured to first end 422 of flexible spring member 406, such as by crimping or otherwise deforming an outer peripheral portion 432 of end member 402 to form a substantially fluid-tight, crimped-edge connection with mounting bead 426 and/or end 422 of flexible spring member 406.

End member 404 is shown in the exemplary arrangement in FIGS. 4 and 5 as being of a type commonly referred to as a piston (or a roll-off piston) that has an outer surface 434 that abuttingly engages flexible spring member 406 such that a rolling lobe 436 is formed therealong. As gas spring assembly 400 is displaced between extended and collapsed conditions, as is respectively represented in FIG. 5 by arrows EXT and CLP, rolling lobe 436 can be displaced along outer surface 434 in a conventional manner.

As identified in FIG. 5, end member 404 extends generally between a first or upper end 438 and a second or lower end 440. End member 404 can be formed from any suitable material or combination of materials, and can include any suitable number of one or more components. As one example, the end member can be at least partially formed from metal and/or polymeric materials including one or more walls and/or wall portions. As another example, the end member could be formed from two or more parts and/or components that are secured together, such as by way of one or more securement devices and/or flowed-material joints, for example.

In the arrangement shown in FIGS. 4 and 5, end member 404 is shown as including a mounting wall portion 442 and a side wall portion 444. In some cases, end member 404 can also include an end wall portion 446 and a side wall portion 448. In the arrangement shown in FIGS. 4 and 5, for example, mounting wall portion 442 at least partially defines a wall section 450, and at least side wall portion 444, end wall portion 446 and side wall portion 448 define a wall section 452 of end member 404. In some cases, wall section 450 can at least partially form a component that may be referred to as a piston base, and wall section 452 can at least partially form a component may be referred to as a piston shell. Additionally, it will be appreciated that wall sections 450 and 452 can be secured to one another in any manner suitable for forming a substantially fluid tight connection between two or more of the wall portions thereof, such as by way of a flowed-material joint 454, for example. It will be appreciated, however, that other configurations and/or constructions could alternately be used.

Side wall portion 444 of end member 404 can include outer surface 434 that is dimensioned to abuttingly engage an outer surface 456 of flexible spring member 406 such that rolling lobe 436 is formed along flexible wall 420. As gas spring assembly 400 is displaced between compressed and extended conditions, rolling lobe 436 can be displaced along outer surface 434 in a generally conventional manner, as mentioned above. It will be recognized that a wide variety of sizes, shapes, profiles and/or configurations can and have been used in forming end members of the type and kind referred to as pistons or roll-off pistons, such as end member 404, for example. As such, it will be appreciated that the wall portions of the end member (e.g., side wall portion 444 and outer surface 434 thereof) can be of any suitable shape, profile and/or configuration, such as may be useful to provide one or more desired performance characteristics, for example, and that the profile shown in FIGS. 4 and 5 is merely exemplary.

As indicated above, it will be appreciated that the one or more end members of the gas spring assembly can be operatively connected or otherwise secured to the flexible spring member in any suitable manner. For example, wall section 452 of end member 404 can include side wall portion 448 that extends longitudinally-outward beyond end wall portion 446, and extends peripherally about axis AX. It will be appreciated that side wall portion 448 can be formed with and/or operatively connected to one or more other wall portions of wall section 452 in any suitable manner. As one example, side wall portion 448 can be integrally formed with side wall portion 444 and end wall portion 446.

In a preferred arrangement, side wall portion 448 can be positioned such that end wall portion 446 extends radially-outward from side wall portion 448 toward side wall portion 444. In such case, side wall portion 448 can at least partially define an opening 458 into end member 404. Additionally, side wall portion 448 can extend axially away from end wall portion 446 toward a distal edge 460. Side wall portion 448 can also include an outer surface 462 that is dimensioned to receive mounting bead 428 of end 424 of flexible wall 406 such that a substantially fluid-tight seal can be formed therebetween. In some cases, a retaining ridge 464 can project radially-outwardly from along the side wall portion 448 and can extend peripherally along at least a portion thereof, such as may assist in retaining end 424 of flexible wall 406 in abutting engagement on or along the side wall portion.

A gas spring assembly in accordance with the subject matter of the present disclosure can include an additional volume, reservoir and/or other chamber that is capable of being passively introduced to and/or isolated from the spring chamber (e.g., spring chamber 408) of the gas spring assembly. In the arrangement shown in FIGS. 4 and 5, for example, gas spring assembly 400 includes a reservoir assembly 466 that is disposed within spring chamber 408 and operatively supported along one of the end members of the gas spring assembly. In the exemplary arrangement shown in FIG. 5, reservoir assembly is supported on end member 404. It will be appreciated, however, that other configurations and/or arrangements could alternately be used. In some cases, end member 404 can include one or more additional features and/or components. For example, mounting wall portion 442 of wall section 450 includes an offset wall portion 467 that extends annularly about axis AX and is dimensioned to support reservoir assembly 466. In an assembled condition, the end member (e.g., end member 404) and the reservoir assembly (e.g., reservoir assembly 466) can be referred to herein as an end member assembly, such as is represented as end member assembly AS2 in FIG. 5, for example.

Reservoir assembly 466 is shown in FIG. 5 as including a reservoir body 468 that includes a reservoir wall 470 extending peripherally about axis AX to at least partially define a reservoir chamber 472. Reservoir body 468 extends axially between a first end (not numbered) oriented toward end member 402 and a second end (not numbered) disposed toward end member 404. Reservoir wall 470 includes a side wall portion 474, an end wall portion 476 disposed along the first end of reservoir body 468 and a mounting wall portion 478 disposed along the second end of reservoir body 468. End wall portion 476 can be oriented transverse to side wall portion 474 and/or axis AX, and can extend radially inward from along side wall portion 474. End wall portion 476 can include an inner edge (not numbered) that at least partially defines an opening (not numbered) in the end wall portion. Mounting wall portion 478 can be oriented transverse to side wall portion 474 and/or axis AX, and can extend radially outward beyond side wall portion 474 to an outer peripheral edge (not numbered). Mounting wall portion 478 includes a mounting surface (not numbered) disposed in facing relation to end member 404 and dimensioned to abuttingly engage offset wall portion 468.

It will be appreciated that reservoir body 468 can be secured on or along end member 404 in any suitable manner. As one example, one or more securement devices 480 can be provided on or along end member 404. Reservoir assembly 466 can include a retaining ring 482 that extends over mounting wall portion 478 and can be secured to end member 404 by way of securement devices 484 engaging securement devices 480. In some cases, retaining ring 482 can include an annular recess (not numbered) dimensioned to receive at least a portion of mounting wall portion 478 and thereby secure reservoir body 468 on or along end member 404.

Reservoir assembly 466 can also include a reservoir piston 486 that is receivingly engaged within reservoir body 468 and dimensioned for telescopic or axially-reciprocal motion relative thereto. Reservoir piston 486 includes a piston wall 488 that extends peripherally about axis AX and axially between a first end (not numbered) disposed toward first end member 402 and a second end (not numbered) disposed toward end member 404. Piston wall 488 can include a side wall portion 490 that extends in a generally axial direction and is dimensioned for receipt within the opening (not numbered) in end wall portion 476. Piston wall 488 can also include an end wall portion 492 that extends across side wall portion 490 along the first end (not numbered) of reservoir piston 486 to form a closed end thereof. Piston wall 488 can further include a flange wall portion 494 disposed along the second end (not numbered) of reservoir piston 486 and extending radially outward from along side wall portion 490 to an outer peripheral edge (not numbered). In a preferred arrangement, the outer peripheral edge of flange wall portion 494 is dimensioned to extend radially outward beyond the inner edge of end wall portion 476 of reservoir body 468 such that end wall portion 476 and flange wall portion 494 radially overlap one another.

Reservoir assembly 466 can also include a biasing element 496 operatively disposed between reservoir piston 486 and at least one of reservoir body 468 and end member 404. In the arrangement shown in FIG. 5, biasing element 496 takes the form of a coil spring that urges reservoir piston into an extended position relative to reservoir body. At least one of reservoir body 468 and reservoir piston 486 can include an opening extending through a wall or wall portion thereof such that reservoir chamber 472 can be disposed in fluid communication with spring chamber 408 during at least some conditions of use of the gas spring assembly. In the arrangement shown in FIG. 5, for example, reservoir wall 470 of reservoir body 468 includes a hole or opening 498 extending therethrough. Additionally, or in the alternative, piston wall 488 of reservoir piston 486 can include a recess or opening 500 formed therethrough. Though shown in FIG. 5 as having an approximately triangular shapes that are inverted relative to one another, it will be appreciated that openings having any combination of a wide variety of shapes, sizes, quantities and configurations could alternately be used, such as a plurality of smaller holes as well as openings that are circular, polygonal, ovoid and/or teardrop shapes, for example. As reservoir piston 486 is axially displaced toward second mounting wall portion 442 of end member 404, openings 498 and 500 proceed to overlap one another and thereby reduce the total area of the opening through which reservoir chamber 472 and spring chamber 408 can fluidically communicate with one another, such as is represented in FIG. 5 by dashed line 486'. Reservoir assembly 466 can, optionally, include a mass or weight 502 that together with the properties of biasing element 496 can be selectively included to tune, optimize or otherwise alter the conditions under which reservoir piston 486 is displaced relative to reservoir body 468.

As discussed above, a gas spring assembly according to the subject matter of the present disclosure is constructed to operate at a first spring rate under a first predetermined condition, such as, for example, during conditions in which normal body bounce and roll inputs are experienced under dynamic use of an associated vehicle (e.g., vehicle VHC in FIG. 1). A gas spring assembly according to the subject matter of the present disclosure is also constructed to operate at a second spring rate under a second predetermined condition, such as, for example, during conditions when sudden or harsh impacts or other transient inputs of a large magnitude (e.g., sudden engagement of a pothole in a road surface) are experienced during dynamic use of the associated vehicle. In some cases, the second predetermined condition could be characterized as a predetermined pressure differential between gas within a spring chamber (e.g., spring chamber 408) and the gas within an additional volume, reservoir or other chamber (e.g., reservoir chamber 472). In other cases, the second predetermined condition could be characterized as a predetermined acceleration being applied to an end member (e.g., end member 404) and associated components thereof (e.g., reservoir piston 486 and optionally, mass 502). Upon exceeding the predetermined pressure differential, predetermined acceleration or other predetermined threshold, one or more flow control systems (e.g., reservoir piston 486 and/or openings 498 and 500) can be passively altered to vary the gas spring assembly from operating at the first spring rate to operating at the second spring rate. Upon decreasing from the predetermined pressure differential, predetermined acceleration or other predetermined threshold, the one or more flow control systems (e.g., reservoir piston 486 and/or openings 498 and 500) can be passively actuated to return the gas spring assembly to the first spring rate from the second spring rate. In some cases, the first spring rate can be less than the second spring rate. In other cases, the first spring rate can be greater than the second spring rate.

As mentioned above, a gas spring assembly according to the subject matter of the present disclosure can include at least one flow control system that is operatively connected between the spring chamber and the volume, reservoir or other chamber of the gas spring assembly. In a preferred arrangement, the one or more flow control systems can be adapted for passive operation (i.e., actuation or activation without manual input from a user or electronic input from an associated system or device) to selectively permit and/or inhibit pressurized gas flow between the spring chamber and the corresponding pressurized gas volume, reservoir or other chamber in one or more directions of flow.

It will be appreciated that the flow control systems can be of any suitable size, shape, configuration and/or construction, and can include any combination of features and components suitable for selectively permitting and/or inhibiting pressurized gas flow between the spring chamber and the corresponding pressurized gas volume, reservoir or other chamber. In some cases, flow control systems can include two or more gas flow passages and a control device operatively associated with one of the gas flow passages. In other cases, two or more control devices can be included with each control device operatively associated with a different one of the gas flow ports. Examples of passive operation of a control device can include differential-pressure actuation and/or inertial actuation. That is, in some cases, the one or more control devices can be differential pressure-actuated control devices that open and close in response to predetermined differential pressure conditions between the spring chamber and the corresponding pressurized gas volume. Additionally, or in the alternative, the one or more control devices can, in some cases, be inertially-actuated that open and close in response to the incurrence and abatement of acceleration inputs acting on one or more components of an end member of the gas spring assembly. In some cases, passive control devices that actuate as a result of inertial or acceleration-based inputs may be preferred.

In the construction shown in FIGS. 4 and 5, reservoir piston 486 is disposed in an extended position under a first predetermined condition of use, such as, for example, during conditions in which normal body bounce and roll inputs are experienced under dynamic use of an associated vehicle (e.g., vehicle VHC in FIG. 1). In such an extended position, pressurized gas transfer through openings 498 and 500 can permit spring chamber 408 and reservoir chamber 472 to act as a substantially contiguous volume generating a corresponding first spring rate of gas spring assembly 400. Upon experiencing a second predetermined condition, such as, for example, during conditions when sudden or harsh impacts or other transient inputs of a large magnitude (e.g., sudden engagement of a pothole in a road surface), end member 408 and reservoir body 468 which is supported thereon is rapidly displaced in an axial direction toward reservoir piston 486. For a brief period of time, reservoir piston 486 remains stationary relative to reservoir body 468 resulting in relative displacement therebetween. Such relative displacement causes openings 498 and 500 to advance toward and overlap with one another thereby reducing the size of the passage through which spring chamber 408 and reservoir chamber 472 can fluidically communicate with one another. Upon sufficient axial displacement, side wall portions 474 and 490 can respectively overlap openings 500 and 498 to substantially isolate reservoir chamber 472 from spring chamber 408. Such a reduction in volume will result in a substantially instantaneous increase in spring rate and natural frequency of the gas spring assembly, which may be desirable under certain conditions of use (e.g., vehicle corner and dynamic input events). As the acceleration abates, biasing element 496 urges reservoir piston 486 toward an extended condition in which openings 498 and 500 are again fully exposed.

Figure 6:
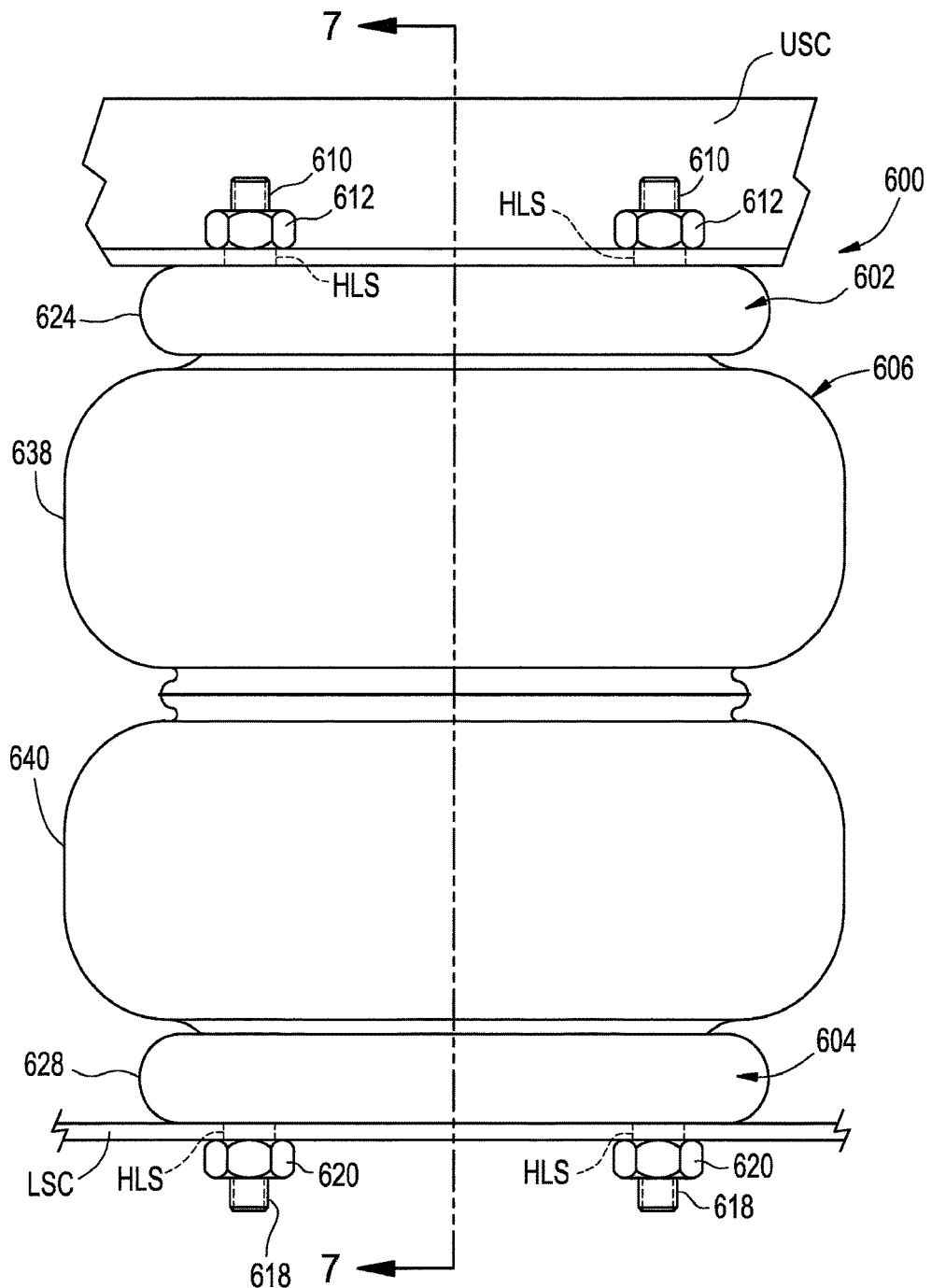
FIG. 6 is a side view of a further example of a gas spring assembly in accordance with the subject matter of the present disclosure.
Figure 7:
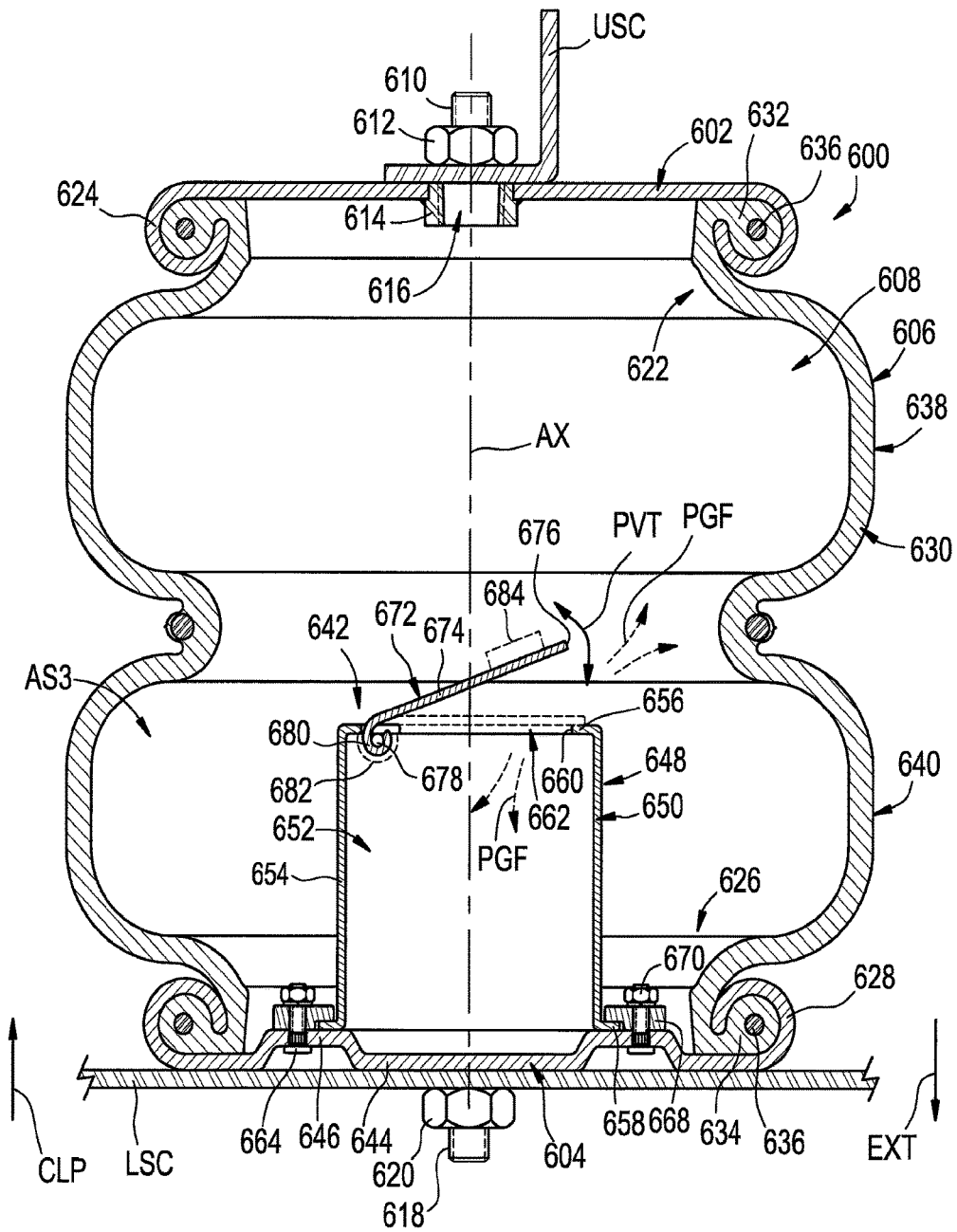
FIG. 7 is a cross-sectional side view of the gas spring assembly in FIG. 6 taken from along line 7-7 therein.

A further example of a gas spring assembly 600 is shown in FIGS. 6 and 7 as having a longitudinally-extending axis AX (FIG. 7), and can include one or more end members, such as an end member 602 and an end member 604 that is spaced longitudinally from end member 602. A flexible spring member 606 can extend peripherally around axis AX and can be secured between the end members in a substantially fluid-tight manner such that a spring chamber 608 (FIG. 7) is at least partially defined therebetween.

Gas spring assembly 600 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 6 and 7, for example, end member 602 is secured along a first or upper structural component USC, such as associated vehicle body BDY in FIG. 1, for example, and can be secured thereon in any suitable manner. For example, one or more securement devices 610, such as mounting studs, for example, can be included along end member 602. In some cases, the one or more securement devices (e.g., mounting studs 610) can project outwardly from end member 602 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more securement devices 612, such as threaded nuts, for example.

Additionally, one or more gas transfer ports can optionally be provided to permit fluid communication with spring chamber 608, such as may be used for transferring pressurized gas into and/or out of the spring chamber. For example, a connection can be provided on or along one of the end members (e.g., end member 602) such as may be used for attachment of a gas transfer line (e.g., one of gas transfer lines 118 in FIG. 1). In the exemplary arrangement shown in FIGS. 6 and 7, a connector fitting 614 is provided on or along one of the end members (e.g., end member 602) such as may be used for attachment of one of gas transfer lines 118 in FIG. 1, for example, and can include a passage 616 extending through the end member in fluid communication with spring chamber 608.

End member 604 can be secured along a second or lower structural component LSC, such as an axle AXL in FIG. 1, for example, in any suitable manner. As one example, lower structural component LSC could include one or more mounting holes HLS extending therethrough. One or more securement devices 618, such as mounting studs, for example, can be included along end member 604. In some cases, the one or more securement devices (e.g., mounting studs 618) can project outwardly from end member 604 and can be secured thereon in a suitable manner, such as, for example, by way of a flowed-material joint (not shown) or a press-fit connection (not identified). Additionally, such one or more securement devices can extend through mounting holes HLS in lower structural component USC and receive one or more securement devices 620, such as threaded nuts for example. As an alternative to one or more of securement devices 610/612 and/or 618/620, one or more threaded passages (e.g., blind passages and/or through passages) could be used in conjunction with a corresponding number of one or more threaded fasteners.

It will be appreciated that the one or more end members can be of any suitable type, kind, construction and/or configuration, and can be operatively connected or otherwise secured to the flexible wall in any suitable manner. In the exemplary arrangement shown in FIGS. 6 and 7, for example, end members 602 and 604 are of a type commonly referred to as bead plates. End member 602 is shown as being secured to a first end 622 of flexible spring member 606 using a crimped-edge connection in which an outer peripheral edge 624 of the end member is crimped or otherwise deformed about a portion of first end 622 of flexible spring member 606 such that a substantially fluid-tight seal is formed therebetween. Similarly, end member 604 is shown as being secured to a second end 626 of flexible spring member 606 using a crimped-edge connection in which an outer peripheral edge 628 of the end member is crimped or otherwise deformed about a portion of second end 626 of flexible spring member 606 such that a substantially fluid-tight seal is formed therebetween.

Gas spring assembly 600 is shown as being of a type commonly referred to as a convoluted or bellows-type construction, and it will be appreciated that any suitable type or kind of convoluted spring construction can be used. As such, it will be appreciated that flexible spring member 606 include any suitable number of one or more convoluted wall portions disposed between the opposing end members. Flexible spring member 606 can include a flexible wall 630 that is at least partially formed from one or more layers or plies of elastomeric material (e.g., natural rubber, synthetic rubber and/or thermoplastic elastomer) and can optionally include one or more plies or layers of filament reinforcing material. In some cases, flexible spring member 606 can, optionally, include a mounting bead disposed along either one or both of ends 622 and 626. In the arrangement shown in FIGS. 6 and 7, mounting beads 632 and 634 are shown as being respectively disposed along ends 622 and 626. In some cases, the mounting beads can, optionally, include a reinforcing element, such as an endless, annular bead wire 636, for example. Additionally, flexible spring member 606 can, optionally, include one or more girdle hoops 638 (FIG. 7) disposed along the flexible wall. In such case, a convoluted wall portion 638 can extend between the girdle hoop and end member 602, and a convoluted wall portion 640 can extend between the girdle hoop and end member 604.

A gas spring assembly in accordance with the subject matter of the present disclosure can include an additional volume, reservoir and/or other chamber that is capable of being passively introduced to and/or isolated from the spring chamber (e.g., spring chamber 408) of the gas spring assembly. In the arrangement shown in FIGS. 6 and 7, for example, gas spring assembly 600 includes a reservoir assembly 642 that is disposed within spring chamber 608 and operatively supported along one of the end members of the gas spring assembly. In the exemplary arrangement shown in FIG. 7, reservoir assembly is supported on end member 604. It will be appreciated that end members 602 and 604 can be of any suitable construction, and that other configurations and/or arrangements could alternately be used. For example, end member 604 can include one or more additional features and/or components. As shown in FIG. 7, end member 604 includes a mounting wall portion 644 and an offset wall portion 646 that extends annularly about axis AX and is disposed in axially-spaced relation to mounting wall portion 644. It will be appreciated, however, that other configurations and/or arrangements could alternately be used. In an assembled condition, the end member (e.g., end member 604) and the reservoir assembly (e.g., reservoir assembly 642) can be referred to herein as an end member assembly, such as is represented as end member assembly AS3 in FIG. 7, for example.

Reservoir assembly 642 is shown in FIG. 7 as including a reservoir body 648 that includes a reservoir wall 650 extending peripherally about axis AX to at least partially define a reservoir chamber 652. Reservoir body 648 extends axially between a first end (not numbered) oriented toward end member 602 and a second end (not numbered) disposed toward end member 604. Reservoir wall 650 includes a side wall portion 654, an end wall portion 656 disposed along the first end of reservoir body 648 and a mounting wall portion 658 disposed along the second end of reservoir body 648. End wall portion 656 can be oriented transverse to side wall portion 654 and/or axis AX, and can extend radially inward from along side wall portion 654. End wall portion 656 can include an inner edge 660 that at least partially defines an opening 662 in the end wall portion. Mounting wall portion 658 can be oriented transverse to side wall portion 654 and/or axis AX, and can extend radially outward beyond side wall portion 654 to an outer peripheral edge (not numbered). Mounting wall portion 658 includes a mounting surface (not numbered) disposed in facing relation to end member 604 and dimensioned to abuttingly engage offset wall portion 646.

It will be appreciated that reservoir body 648 can be secured on or along end member 604 in any suitable manner. As one example, one or more securement devices 664 can be provided on or along end member 604. Reservoir assembly 642 can include a retaining ring 668 that extends over mounting wall portion 658 and can be secured to end member 604 by way of securement devices 670 engaging securement devices 664. In some cases, retaining ring 668 can include an annular recess (not numbered) dimensioned to receive at least a portion of mounting wall portion 658 and thereby secure reservoir body 648 on or along end member 604.

Reservoir assembly 642 can also include a reservoir lid 672 that is operatively supported on reservoir body 648 and dimensioned to extend at least partially across opening 662. Reservoir lid 672 includes a lid wall 674 that includes an outer peripheral edge 676 having a size that is approximately equal to or larger than opening 662 such that in a closed position the reservoir lid can substantially isolate reservoir chamber 652 from spring chamber 608. Reservoir assembly 642 can include a hinge element 678 operatively connected to reservoir body 648. Lid wall 674 can include a hinge wall portion 680 that is operatively connected to hinge element 678 such that reservoir lid 672 can be displaced about hinge element 678 relative to reservoir body 648, as is represented in FIG. 7 by arrow PVT.

Reservoir assembly 642 can also include a biasing element 682 operatively connected between reservoir lid 672 and reservoir body 648. In some cases, biasing element 682 can take the form of a coil or torsion spring that urges reservoir lid 672 into an open position relative to reservoir body 648. In an open condition of reservoir lid 672, such as is represented in FIG. 7 by dashed lines 672', for example, reservoir chamber 652 is in fluid communication with spring chamber 608 through opening 662 in reservoir body 648. In a second or closed condition of reservoir lid 672, reservoir chamber 652 is substantially fluidically isolated from spring chamber 608. Reservoir assembly 642 can, optionally, include a mass or weight 684 that together with the properties of biasing element 682 and reservoir lid 672 can be selectively utilized to tune, optimize or otherwise alter the conditions under which reservoir lid 672 is displaced relative to reservoir body 648 between open and closed conditions.

As discussed above, a gas spring assembly according to the subject matter of the present disclosure is constructed to operate at a first spring rate under a first predetermined condition, such as, for example, during conditions in which normal body bounce and roll inputs are experienced under dynamic use of an associated vehicle (e.g., vehicle VHC in FIG. 1). A gas spring assembly according to the subject matter of the present disclosure is also constructed to operate at a second spring rate under a second predetermined condition, such as, for example, during conditions when sudden or harsh impacts or other transient inputs of a large magnitude (e.g., sudden engagement of a pothole in a road surface) are experienced during dynamic use of the associated vehicle. In some cases, the second predetermined condition could be characterized as a predetermined pressure differential between the pressurized gas within a spring chamber (e.g., spring chamber 608) and the pressurized gas within an additional volume, reservoir or other chamber (e.g., reservoir chamber 652). In other cases, the second predetermined condition could be characterized as a predetermined acceleration being applied to an end member (e.g., end member 604) and associated components thereof (e.g., reservoir lid 672 and, optionally, mass 684).

Upon exceeding the predetermined pressure differential, predetermined acceleration or other predetermined threshold, one or more flow control systems (e.g., reservoir lid 672 and/or opening 662) can be passively altered to vary the gas spring assembly from operating at the first spring rate to operating at the second spring rate. Upon decreasing from the predetermined pressure differential, predetermined acceleration or other predetermined threshold, the one or more flow control systems (e.g., reservoir lid 672 and/or opening 662) can be passively actuated to return the gas spring assembly to the first spring rate from the second spring rate. In some cases, the first spring rate can be less than the second spring rate. In other cases, the first spring rate can be greater than the second spring rate.

As mentioned above, a gas spring assembly according to the subject matter of the present disclosure can include at least one flow control system that is operatively connected between the spring chamber and volume, reservoir or other chamber of the gas spring assembly. In a preferred arrangement, the one or more flow control systems can be adapted for passive operation (i.e., actuation or activation without manual input from a user or electronic input from an associated system or device) to selectively permit and/or inhibit pressurized gas flow between the spring chamber and the corresponding pressurized gas volume, reservoir or other chamber in one or more directions of flow.

It will be appreciated that the flow control systems can be of any suitable size, shape, configuration and/or construction, and can include any combination of features and components suitable for selectively permitting and/or inhibiting pressurized gas flow between the spring chamber and the corresponding pressurized gas volume, reservoir or other chamber. In some cases, a flow control systems can include two or more gas flow passages and a control device operatively associated with one of the gas flow passages. In other cases, two or more control devices can be included with each control device operatively associated with a different one of the gas flow ports. Examples of passive operation of a control device can include differential-pressure actuation and/or inertial actuation. That is, in some cases, the one or more control devices can be differential pressure-actuated control devices that open and close in response to predetermined differential pressure conditions between the spring chamber and the corresponding pressurized gas volume. Additionally, or in the alternative, the one or more control devices can, in some cases, be inertially-actuated that open and close in response to the incurrence and abatement of acceleration inputs acting on one or more components of an end member of the gas spring assembly. In some cases, passive control devices that actuate as a result of inertial or acceleration-based inputs may be preferred.

In the construction shown in FIGS. 6 and 7, reservoir lid 672 is disposed in an open position under a first predetermined condition of use, such as, for example, during conditions in which normal body bounce and roll inputs are experienced under dynamic use of an associated vehicle (e.g., vehicle VHC in FIG. 1). In such an open position, pressurized gas transfer through opening 662 can permit spring chamber 608 and reservoir chamber 652 to act as a substantially contiguous volume generating a corresponding first spring rate of gas spring assembly 600, such as is represented in FIG. 7 by arrows PGF. Upon experiencing a second predetermined condition, such as, for example, during conditions when sudden or harsh impacts or other transient inputs of a large magnitude (e.g., sudden engagement of a pothole in a road surface), end member 604 and reservoir body 648 which is supported thereon are rapidly displaced toward reservoir lid 672. For a brief period of time, reservoir lid 672 remains stationary relative to reservoir body 648 resulting in relative displacement therebetween. Such relative displacement causes reservoir lid 672 to advance toward the reservoir body and close opening 662 through which spring chamber 608 and reservoir chamber 652 fluidically communication with one another to substantially isolate reservoir chamber 652 from spring chamber 608, such as is represented in FIG. 7 by dashed line 672'. Such a reduction in volume will result in a substantially instantaneous increase in spring rate and natural frequency of the gas spring assembly, which may be desirable under certain conditions of use (e.g., vehicle corner and dynamic input events). As the acceleration abates, biasing element 682 urges reservoir lid 672 toward an open position in which opening 662 is again fully exposed.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member assembly dimensioned for securement to an associated flexible spring member to at least partially form an associated gas spring assembly with an associated spring chamber, said end member assembly comprising:
   an end member dimensioned for securement to the associated flexible spring member to at least partially define the associated spring chamber, said end member having a longitudinal axis and including an end member wall at least partially defining an end member chamber; and,
   a reservoir assembly disposed within said end member chamber, said reservoir assembly including:
      a reservoir body including a reservoir wall at least partially defining a reservoir chamber, said reservoir wall including a side wall portion with a passage formed therethrough in a direction transverse to said longitudinal axis, said passage having a passage cross-sectional area and disposed in fluid communication between said reservoir chamber and said end member chamber; and a reservoir piston at least partially disposed within said reservoir chamber and operatively supported along said reservoir body for telescopic displacement in a longitudinal direction between a first position and a second position;

said end member assembly operable such that:

under a first predetermined condition of use, said reservoir assembly is in a first operable condition in which said reservoir piston is disposed in said first position and a first percentage of said passage cross-sectional area is exposed between said reservoir chamber and said end member chamber such that the associated gas spring assembly would have a first spring rate; and, under a second predetermined condition of use, said reservoir assembly is in a second operable condition in which said reservoir piston is disposed in said second position and a second percentage of said passage cross-sectional area is exposed between said reservoir chamber and said end member chamber, said second percentage being different than said first percentage such that the associated gas spring assembly would have a second spring rate that is different from said first spring rate.

2. A gas spring assembly comprising:
a flexible spring member having a longitudinal axis and extending lengthwise between a first end and a second end opposite said first end to at least partially define a spring chamber;
a first end member secured across said first end of said flexible spring member such that a substantially fluid-tight seal is formed therebetween; and,
an end member assembly according to claim 1 secured across said second end of said flexible spring member.

3. A suspension system comprising:
a pressurized gas system including a pressurized gas source and a control device in fluid communication with the pressurized gas source; and,
at least one gas spring assembly according to claim 2 disposed in fluid communication with said pressurized gas source with said control device disposed in fluid communication therebetween.

4. An end member assembly according to claim 1, wherein said end member wall at least partially defines an opening between said reservoir chamber and the associated spring chamber.

5. An end member assembly according to claim 1, wherein said reservoir assembly includes a biasing element operatively engaged with said reservoir piston to urge said reservoir piston toward said first position.

6. An end member assembly according to claim 1, wherein axial displacement of said reservoir piston from said first position toward said second position reduces said passage cross-sectional area of said passage from said first percentage to said second percentage.

7. An end member assembly according to claim 1, wherein said reservoir body includes a first end supported on said end member and a second end opposite said first end such that in said first position said reservoir piston is disposed a toward said second end of said reservoir body and in said second position said reservoir piston is disposed toward said first end of said reservoir body.

8. An end member assembly according to claim 1, wherein said second predetermined condition of use includes the associated gas spring assembly experiencing a predetermined pressure differential between pressurized gas within the associated spring chamber and said reservoir chamber.

9. An end member assembly according to claim 1, wherein said second predetermined condition of use includes the associated gas spring assembly experiencing a predetermined acceleration applied to said end member assembly.

10. An end member assembly according to claim 1, wherein said reservoir assembly includes an inertial mass supported on said reservoir piston.

11. An end member assembly dimensioned for securement to an associated flexible spring member, said end member assembly comprising:
an end member dimensioned for securement to the associated flexible spring member, said end member having a longitudinal axis and including an end member wall at least partially defining an end member chamber;
a reservoir body at least partially disposed within said end member chamber, said reservoir body including a reservoir wall at least partially defining a reservoir chamber and a reservoir passage formed therethrough, said reservoir passage having a reservoir passage cross-sectional area and disposed in fluid communication between said reservoir chamber and said end member chamber; and,
a reservoir piston at least partially disposed within said reservoir chamber and operatively supported along said reservoir body for telescopic displacement in a longitudinal direction between a first position and a second position such that:
in said first position, a first percentage of said reservoir passage cross-sectional area is exposed between said reservoir chamber and said end member chamber; and,
in said second position, a second percentage of said reservoir passage cross-sectional area is exposed between said reservoir chamber and said end member chamber with said second percentage being different than said first percentage.

12. An end member assembly according to claim 11, wherein said reservoir piston includes a piston wall with a side wall portion and a piston passage formed therethrough with said piston passage disposed in fluid communication with said reservoir passage in at least one of said first and second positions.

13. An end member assembly according to claim 12, wherein said reservoir passage has an approximately triangular shape and said piston passage has an approximately triangular shape disposed in an inverted orientation relative to said reservoir passage.

14. An end member assembly according to claim 11, wherein said second percentage of said passage cross-sectional area is less than said first percentage.

15. An end member assembly according to claim 11, wherein a spring urges said reservoir piston toward said first position.

16. An end member assembly according to claim 11 further comprising an inertial mass supported on said reservoir piston.

17. An end member assembly according to claim 11, wherein said reservoir wall includes end wall portion at least partially defining an opening through which a portion of said reservoir piston extends in at least said first position.

18. A gas spring assembly comprising:
a flexible spring member having a longitudinal axis and extending lengthwise between a first end and a second end opposite said first end to at least partially define a spring chamber;
a first end member secured across said first end of said flexible spring member such that a substantially fluid-tight seal is formed therebetween; and,
an end member assembly secured across said second end of said flexible spring member, said end member assembly including:
a second end member including an end member wall at least partially defining an end member chamber;
a reservoir body at least partially disposed within said end member chamber, said reservoir body including a reservoir wall at least partially defining a reservoir chamber and a reservoir passage formed through said reservoir wall, said reservoir passage having a reservoir passage cross-sectional area and disposed in fluid communication between said reservoir chamber and said end member chamber; and,
a reservoir piston at least partially disposed within said reservoir chamber and operatively supported along said reservoir body for telescopic displacement in a longitudinal direction between a first position and a second position such that:
in said first position, a first percentage of said reservoir passage cross-sectional area is exposed between said reservoir chamber and said end member chamber; and,
in said second position, a second percentage of said reservoir passage cross-sectional area is exposed between said reservoir chamber and said end member chamber with said second percentage being different than said first percentage.

19. A gas spring assembly according to claim 18 further comprising an inertial mass supported on said reservoir piston.

20. A gas spring assembly according to claim 18, wherein said reservoir wall includes end wall portion at least partially defining an opening through which a portion of said reservoir piston extends in at least said first position.

* * * * *